(12) United States Patent
Gallezot et al.

(10) Patent No.: US 7,324,460 B2
(45) Date of Patent: Jan. 29, 2008

(54) EVENT-DRIVEN FLOW CONTROL FOR A VERY HIGH-SPEED SWITCHING NODE

(75) Inventors: Rene Gallezot, La Celle sur Loop (FR); Rene Glaise, Nice (FR); Francois Le Maut, Nice (FR)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 10/673,595

(22) Filed: Sep. 29, 2003

(65) Prior Publication Data

US 2004/0105384 A1 Jun. 3, 2004

(30) Foreign Application Priority Data

Nov. 28, 2002 (EP) ................... 02368130

(51) Int. Cl.
*H04L 1/00* (2006.01)
(52) U.S. Cl. .................... 370/252; 370/235
(58) Field of Classification Search ........... 370/229, 370/412, 231, 230, 230.1, 235, 232, 389, 370/352, 353

See application file for complete search history.

(56) References Cited

U.S. PATENT DOCUMENTS

| | | | | |
|---|---|---|---|---|
| 5,365,514 A | * | 11/1994 | Hershey et al. | ............. 370/241 |
| 5,493,566 A | * | 2/1996 | Ljungberg et al. | ........... 370/231 |
| 5,533,020 A | * | 7/1996 | Byrn et al. | ............... 370/395.4 |
| 5,793,747 A | * | 8/1998 | Kline | ......................... 370/230 |
| 5,793,977 A | * | 8/1998 | Schmidt | ..................... 709/224 |
| 6,285,679 B1 | * | 9/2001 | Dally et al. | ................. 370/413 |
| 6,996,081 B1 | * | 2/2006 | Brouwer | ...................... 370/335 |
| 2005/0013257 A1 | * | 1/2005 | Garyfalos et al. | ........... 370/252 |
| 2005/0041580 A1 | * | 2/2005 | Petrovykh | .................... 370/229 |

* cited by examiner

*Primary Examiner*—Ricky Q. Ngo
*Assistant Examiner*—Gary Mui
(74) *Attorney, Agent, or Firm*—Joscelyn G. Cockburn

(57) ABSTRACT

A method for controlling the flows of data packets that are switched or routed at nodes of high-speed communication networks is disclosed. According to the invention, resource metering units are assigned to resources shared between devices of the switch or router e.g., shared memories or link bandwidths. When the occupancy of a shared resource reaches a predetermined threshold, an event is generated and transmitted to devices sharing this resource. Furthermore, a periodic refresh of the overall flow control information is performed so that lost events are, however, eventually acted on. Thus, a new device may become active without perturbing the active flows after having gathered enough flow control information.

1 Claim, 6 Drawing Sheets

EVENT-DRIVEN FLOW CONTROL FOR A VERY HIGH-SPEED SWITCHING NODE

FIELD OF THE INVENTION

The present invention relates to data communications in general and, is more particularly concerned with an apparatus and a method to control the flow of data packets that are switched or routed at nodes of high-speed communication networks.

BACKGROUND OF THE INVENTION

High-Speed data network nodes are now implemented from a Tbps (Terabits per second) class of routers and switches which need to carry out an efficient flow-control so as to be lossless. Ideally, no packet should ever be discarded because a particular resource, generally a memory, is temporarily exhausted, while always permitting a full use of the available switching bandwidth. To achieve the necessary level of performance the switching functions are distributed between a switch core and peripheral devices including queuing devices, traffic managers and specialized network processors. Then, a flow control is performed between these devices which results in the need of having to exchange large amounts of information.

To reduce the amount of information, consuming a significant portion of the available communication bandwidth, to be exchanged between the devices participating in the flow-control a standard method is to only report the changes rather than the current status of the devices. For example, if an output switch port egress buffer never gets congested, just because it has not much traffic to handle, nothing is ever to be reported to the switch core. This frees the corresponding bandwidth for other needs.

Hence, this event-driven mode of operation is often preferred to a constant reporting of the current device status which translates, in the above example of the port egress buffer, into the fact that its filling level does not have to be permanently reported to the switch core while its occupancy stays low. In this event-driven mode of operation an event is e.g., the crossing of a filling watermark which must be reported, once, to the relevant devices.

However, this does not occur without introducing some problems. One of the problems created by this mode of operation occurs when one event reporting is missed by one of the devices. Since this information is only transmitted once if, for any reason, it is ignored or missed by the destination device, it cannot be normally acted on, a fact of which the originating device is not even informed. To remedy this, methods have been proposed assuming that an acknowledgment must be issued to each event by the destination device. As an example, U.S. Pat. No. 6,279,046 teaches how such a system can be carried out. This mode of operation requires, however, a level of management (issuing device must keep track of the forwarded event and make sure it receives the corresponding acknowledgment) which is not practically possible in a Tbps class of switches and routers where packets must be moved at a very fast rate i.e., below 10 Ns, when very fast switch ports are considered e.g., OC-768 at 40 Gbps nominal rate or OC-192 at 10 Gbps.

A second type of problem encountered when using an event-driven flow control is when a new device is turn on. Often, while a switch is up and running, a new port or part of port i.e., a sub-port (when several communications lines are sharing a same common switch port adapter) needs to be activated. Hence, the new participant has no knowledge of the status of the other components. The direct consequence is that it may attempt to immediately over-utilize the switching resources since it has no information that prevents it from not doing so. For example, the switch core may suddenly start receiving too much traffic from a new joining port adapter creating congestion and, may be, forcing it to discard packets possibly affecting other flows.

OBJECT OF THE INVENTION

Thus, it is a broad object of the invention to remedy the shortcomings of the prior art as described here above.

It is another object of the invention to provide a method and systems for controlling the flow of data packets that are switched or routed at nodes of high-speed communications networks, which do not require a high level of management thus, allowing to be used for the flow control in a very high-speed (Tbps class) type of switch fabric.

It is a further object of the invention to provide a method and systems for controlling the flow of data packets that are switched or routed at nodes of high-speed communications networks, which take care of event losses in a destination device while permitting that a new device become active without disturbing the active flows.

It is a further object of the invention to provide a method and systems for controlling the flow of data packets that are switched or routed at nodes of high-speed communications networks, which perform a periodic refresh of the overall flow control information so as lost events are however eventually acted on. Also, the invention assumes that a new joining device is not authorized to become actually active until it has gathered enough flow control information to do so.

SUMMARY OF THE INVENTION

The accomplishment of these and other related objects is achieved by an event-driven flow control method in a switching node comprising at least one shared resource. The status of said at least one shared resource, determined by an associated resource metering unit, characterizing the occupancy of said at least one shared resource, said method, using a timer, comprising the steps of:

in said shared resource,
  generating an event when the occupancy of said at least one shared resource changes; and,
  transmitting said event to devices sharing said at least one shared resource;
each time said timer elapses,
  getting a partial status of said at least one shared resource; and,
  transmitting said partial status to devices sharing said at least one shared resource.

Further objects, features and advantages of the present invention will become apparent to the ones skilled in the art upon examination of the following description in reference to the accompanying drawings. It is intended that any additional advantages be incorporated herein.

DETAILED DESCRIPTION OF THE PREFERRED EMBODIMENT

Figure 1:
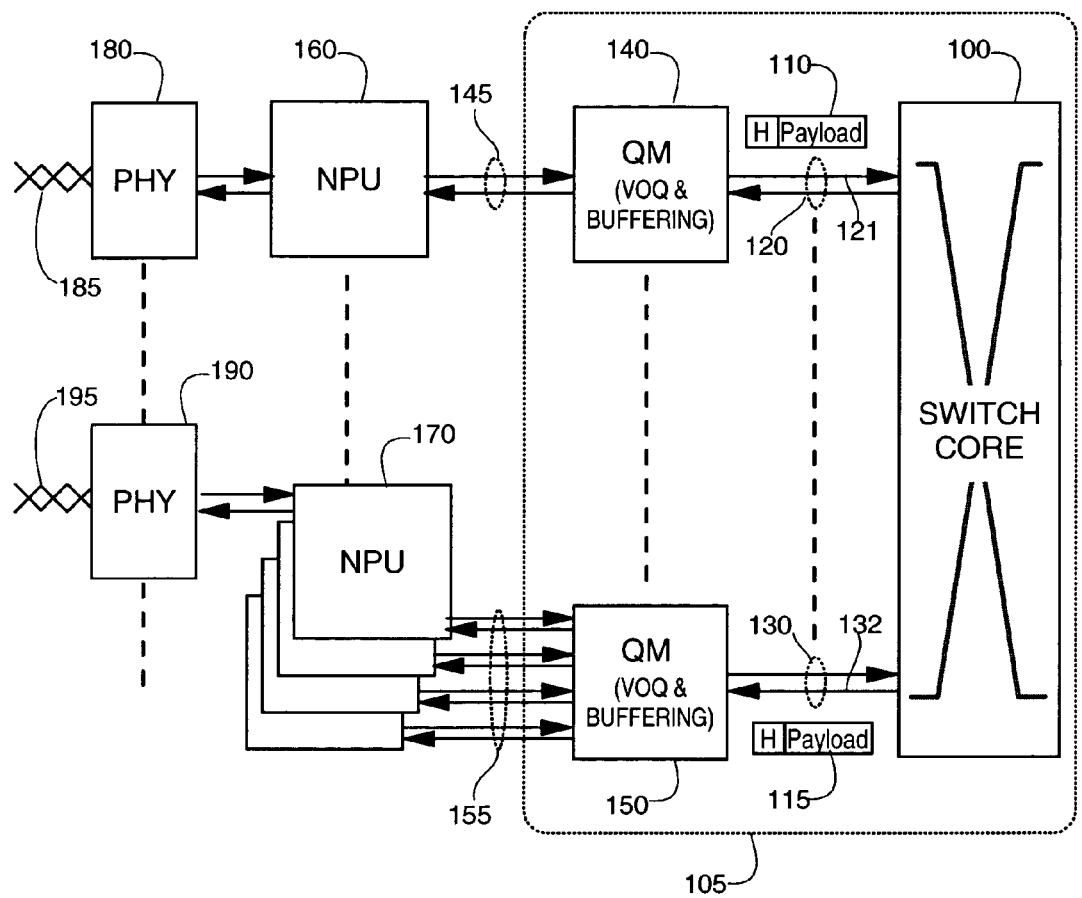
FIG. 1 illustrates a network node in which the method of the invention may be implemented.

FIG. 1 illustrates the context in which the invention better applies. A network node of the kind considered by the invention is comprised of a switching function or switch core (100) aimed at switching packets (110) to/from a set of input and output port pairs (120, 130). Switching function (100) has generally several of those ports typically, in a 8-64 range. Any packet entering through an input port (121) can be directed to any of the output ports (132). Thus, switch core performs the switching node basic function which is to dispatch, through the appropriate output ports, the incoming traffic flows towards their final destinations.

Generally switch core requires, per port pair, a companion chip referred to as a Queue Manager (QM) or Traffic Manager (140, 150). One role of this type of devices, in conjunction with the switch core, is to pace the flows of traffic that are competing for a common resource, the switch core. Typically, QM implements a set of queues organized according to a standard mechanism called VOQ (virtual output queuing). The chief purpose of the VOQ is to prevent any HOL (head-of-line) blocking of the incoming traffic. That is, except for a destination currently busy no incoming packet may ever be blocked because there is already a packet waiting to be served to a port output which is idle or can accept traffic. Also, VOQ is organized by priorities or CoS (class of service) so as no lower priority packet can prevent a higher priority packet to keep moving if switch core can indeed accept it. Another role of QM's (140, 150) is to allow temporary buffering of the outgoing packets (115) once switched. QM's along with the switch core form what is referred to as a switch fabric (105).

In the general case a switch fabric, through its QM's, has to interface NPU's (network processor units) such as (160, 170) in charge of handling the protocols in use by the flows of packets generally, the TCP/IP or Internet suite of protocols plus any other protocols that need to be supported at a network node such as ATM (asynchronous transfer mode) or MPLS (multi-protocol label switching). NPU's in turn interface communications lines (185, 195) through line adapters (180, 190) in charge of handling communications protocol lower layers or physical layers, thus actually taking care of the transport of packets and protocol frames from node to node, or for their insertion and removal over a shared medium such as a LAN (local area network). Typically, a line e.g., (185) can operate at OC48c i.e.: 2.5 Giga or $10^9$ bits per Second (Gbps), OC192c (10 Gbps) and even at OC768c (40 Gbps). These rates are part of a family of rates and formats available for use in optical interfaces, generally referred to as SONET, which is a standard defined by the American National Standards Institute (ANSI) of which there exists an European counterpart, mostly compatible, known as SDH (Synchronous Digital Hierarchy). Other line types comply with the IEEE (i.e., the US Institute of Electrical and Electronics Engineers) 802.3 standard, known as Ethernet, which defines rates up to 1 Gbps (GbE) and 10 Gbps (10 GbE).

Hence, a communications piece of equipment of the kind discussed in FIG. 1, i.e., a router or a switch, may have to handle aggregate data throughput expressed in tera ($10^{12}$) bits per second (Tbps) depending on the number of ports of the switch fabric and speed of the communications lines. As an example, a 64-port switch interfacing 10-Gbps lines, OC192c or 10 GbE, must be able to sustain a 640-Gbps nominal throughput and in practice twice this value to have the necessary speedup factor to handle the peaks of traffic.

Not all the communications lines converging into a router or switch are necessarily of the same speed. A common design practice is to possibly allow sub-ports for each port switch core (130). Hence, a particular QM (150) may be configured to interface e.g., 4 lower speed sub-ports (155) thus, four NPU's (170) and their line adapters, such as (190), so as to multiply the number of lines the equipment can handle. If switch core port have e.g., provision to handle nominally 10-Gbps of traffic each then, attached QM (150) may be configured for example to have four interfaces (155) allowing to get eventually connected to four OC48c lines at 2.5 Gbps such as (195).

QM interfaces to NPU's and lines i.e., the switch-fabric ports (145, 155), often comply to a standard so as product inter-operability between different manufacturers can be guaranteed. Such a standard is known as CSIX-L1 (Common Switch Interface Specification-L1). It specifies signals, packet formats, referred to as CFrames by CSIX-L1 specification, and more generally the mode of operation of the interface.

In the following description, packet, frame and CFrame are terms used interchangeably to designate the type of data chunks exchanged by communications devices to move user information. Packets can be of a fixed or variable size. For example CSIX-L1 specifies that CFrames can have a payload comprised between 1 and 256 bytes while packets through the switch core are generally small, typically 64-byte, fixed-size packets to ease the job of the switch core so as it can actually reach the level of performance mentioned earlier (in a Tbps range). The conversion of variable to fixed-size packets, or the opposite, is a standard function referred to as SAR (segmentation and reassembly) in communications devices. SAR is beyond the scope of the invention and is not further discussed since it is not necessary to the understanding of the invention.

Figure 2:
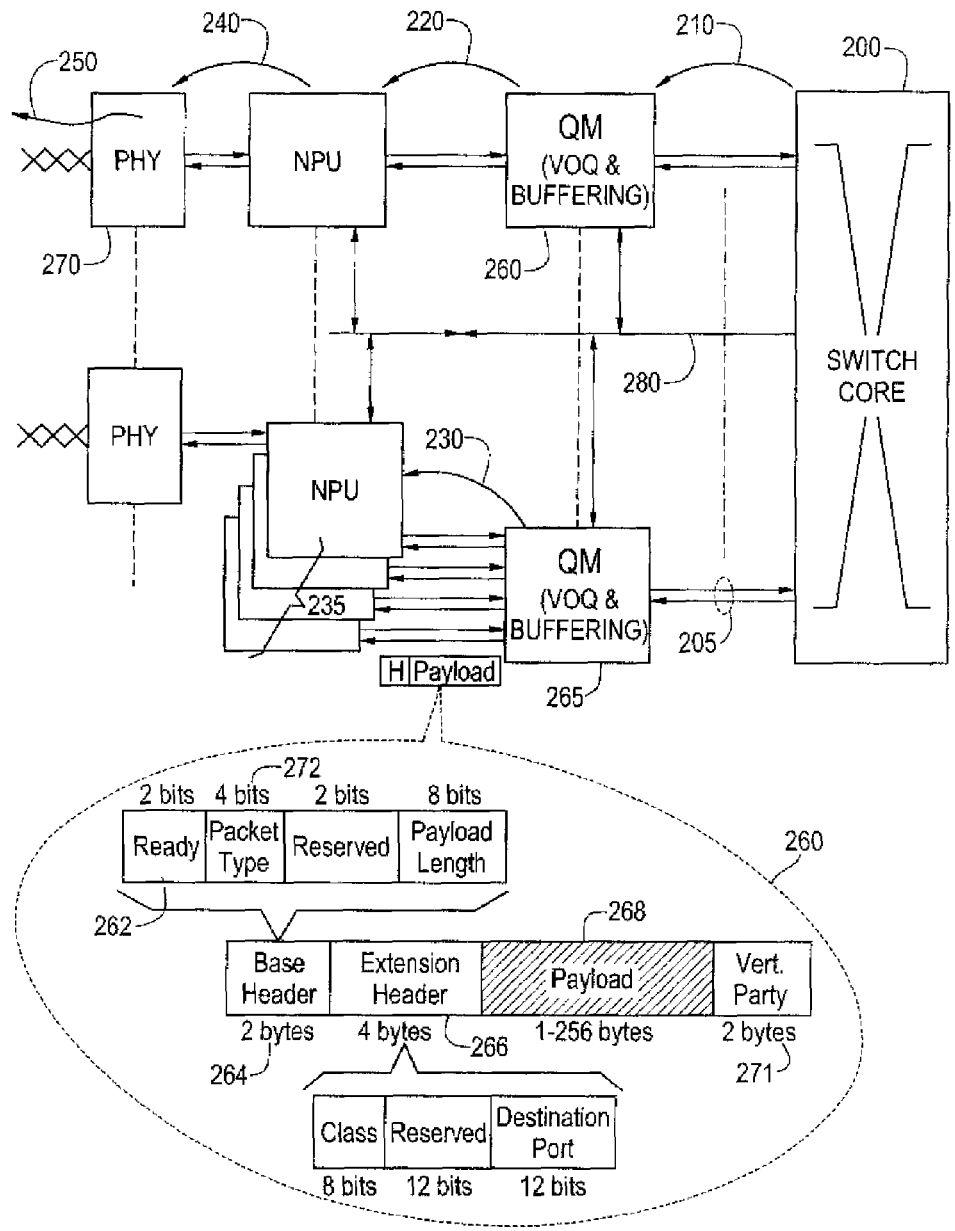
FIG. 2 depicts flow control which is used to operate a switch so as to best manage the available resources, prevent contention and keep traffic moving smoothly without having to discard any frame or packet while resources are not over-committed.

FIG. 2 discusses flow control which is required to operate a switch so as to best manage the available resources, prevent contention and keep traffic moving smoothly without having to discard any frame or packet while resources are not over-committed.

Switch-core (200) is most subject to experience congestion since all ports are converging to it. Hence, there is always the possibility that overall traffic is such that, for an extended period of time, resources are exhausted for one or more ports in the egress direction. This requires that backpressure be applied to the chain of forwarding devices causing the congestion. Backpressure can thus take place at various places of the switching function obviously, between the switch-core and the QM's (210) but also between each QM and its attached NPU (220). As noticed above, one QM may have to apply backpressure to several NPU's when sub-porting is supported (230). Depending on particular designs, backpressure may possibly have to be exercised further backward, up to the physical layer (240), if there are provisions to do so in the corresponding device. Backpressure may even be applied up to the remote source of traffic if protocol in use allows to do it (250). An example of it being TCP, the transport control protocol of Internet which provides for Internet flow control.

FIG. 2 is just an example of the context in which the invention applies. Although FIGS. 1 and 2 describes a typical implementation of a network node switching function many variations may exist in which the invention still applies. As an example, a NPU device may not be needed for all applications. QM may have provision to handle directly the traffic received from the line adapter thus, performing some form of traffic management (TM) on top of its queuing (VOQ) and buffering functions discussed previously. In which case backpressure would apply directly between a queuing and traffic manager (260) directly to its line adapter (270).

Also, the invention does not assume any particular solution to actually carry out backpressure. As an example, the CSIX-L1 interface mentioned above provides for a simple Xon/Xoff type of flow control. To this end the CSIX-L1 CFrame header has a 2-bit ready field (262) part of the 2-byte base header (264). CFrame format, as shown in FIG. 2 (260) is typical of how data are actually organized to be moved between communications devices. Frames have a header here comprised of a base header (264) and of an extension header (266), followed by the payload (268) carrying the end user information. Also, there is often a trailing field (271) for checking data integrity here in the form of a vertical parity field. Hence, each frame moving backward can carry information on the level of readiness of downstream devices thus, enabling a backpressure mechanism.

Alternatively, instead of carrying flow-control information in the header of every frame, specific frames, identified accordingly with a packet type (272), may be issued by downstream devices to inform their upstream counterparts on their state of congestion. Obviously, this in-band flow-control consumes bandwidth at the expense of the user traffic although flow-control frames can preferably replace the idle frames whenever it is possible. Idle frames are generally forwarded when there is nothing to send in order to keep in synch the high-speed links on which frames are moved. Although specific to CSIX-L1 interface, this type of frame format is well representative of how data are generally exchanged between communications devices.

As another alternative to the implementation of a backpressure mechanism, it may as well exist a separate communication channel between all the devices participating in the flow control. This may take e.g., the form of a shared bus (280). However, this option assumes dedicated I/O's and wiring on top of what is necessary for the data paths. I/O's and board wiring traces are scarce resources in Tbps routers and switches thus, it is often (if not always) preferred to carry the information in frame headers and/or to have specific frames (replacing idle frames when possible) for enabling the flow-control as discussed above. Obviously, headers of idle frames also carry a flow-control field (262) and may be used as well.

Again, the invention does not assume any particular implementation of a flow-control to be carried out.

Figure 3:
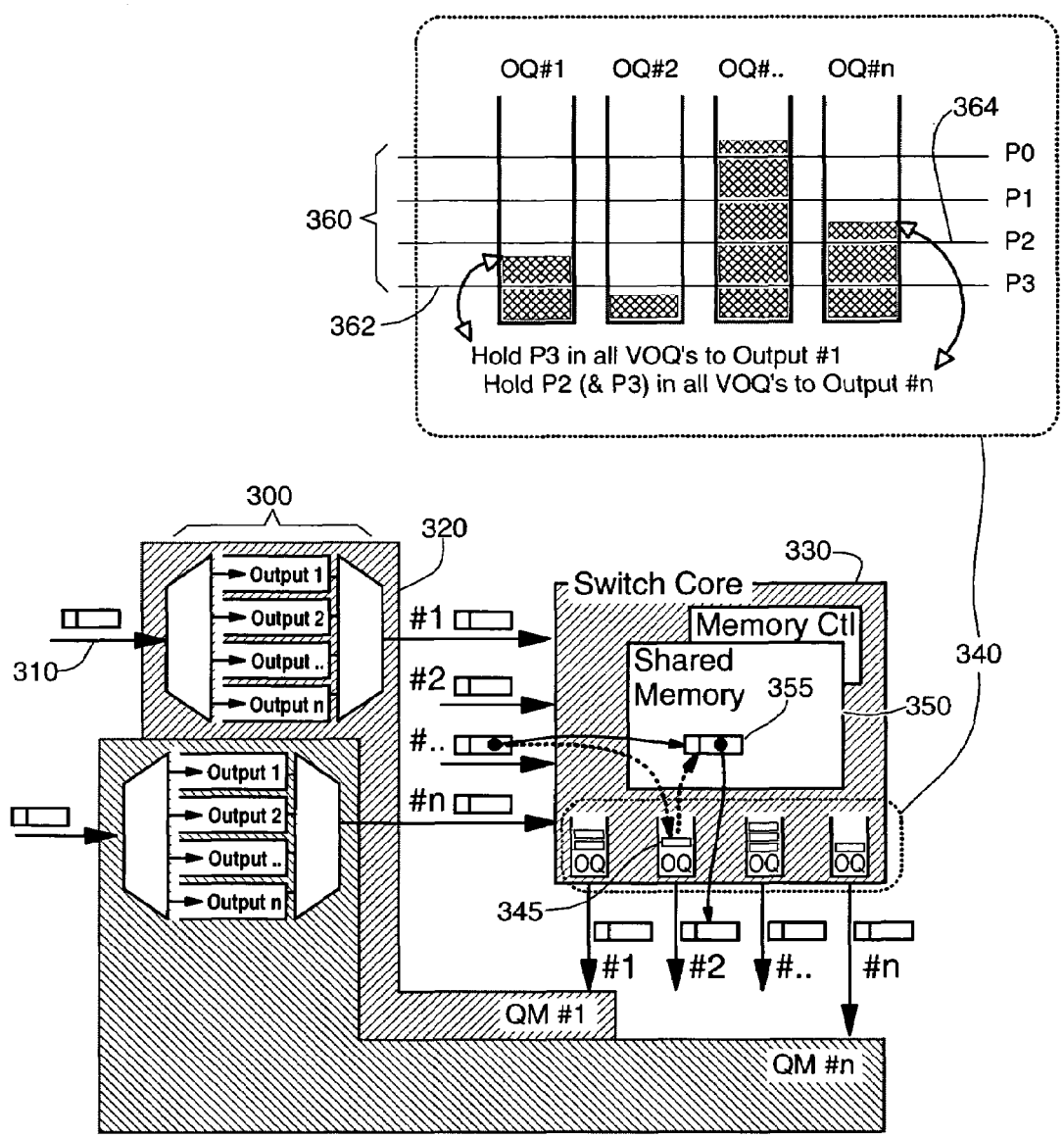
FIG. 3 depicts how the level of utilization of the device resources is evaluated so as forwarding devices can adapt their traffic to prevent congestion from happening hence, performing flow control.

FIG. 3 discusses how the level of utilization of the device resources is evaluated so as forwarding devices can adapt their traffic to prevent congestion from happening hence, performing flow control.

Many of the switch shared resources are made of memory. Memories are available under the form of discrete modules of static or dynamic random access memories i.e., SRAM and DRAM. They can also be imbedded, partly or completely, in the ASIC's (application specific integrated circuits) implementing the various functions shown in FIGS. 1 and 2 namely, the switch core, the QM's and NPU's plus the line adapters. They allow implementing the various queuing structures and buffers necessary to hold temporarily the traffic so as each frame header can be inspected and acted on according to various criterions such as the destination, the class of service, the type of traffic (unicast or multicast), etc.

As already mentioned in FIG. 1 a queuing structure very frequently utilized in a switch is referred to as VOQ i.e., virtual output queuing. It allows, in the ingress path of a QM, to temporarily store the incoming traffic, on a per port destination basis thus, preventing HoL (head-of-line) blocking. HoL blocking is potentially encountered each time incoming traffic, on one input port, has a packet destined for a busy output port. Hence, other packets even though they would be destined for an idle output port, waiting in line are also blocked, since they just cannot enter the switch core (330). To prevent this from ever occurring, each QM thus implements a VOQ scheme (300). Incoming traffic on each input switch fabric port (310) i.e., in each ingress QM (320), is sorted per port destination so if an output adapter is experiencing congestion, traffic for other port destinations, if any, can be selected instead. Therefore, no packet can be blocked because another one is waiting for being admitted in the switch core.

Every such queue is generally also organized by priority too. That is, incoming frame headers, which carry a class or priority tag, as shown in FIG. 2, are inspected not only to temporarily store packets in different queues, according to the destination ports, but are also sorted by priority within each queue so that higher priority packets are guaranteed to be admitted first in the switch core thus, getting precedence over lower priority traffic. In turn, switch core applies the same rule to the admitted packets, always giving privilege to higher priorities.

Switch core (330) can be implemented in many alternate ways. A common architecture, used as an example to illustrate the invention, is a combination of output queuing or OQ (340) and shared-memory i.e., SM (350) for temporarily storing all incoming frame to be switched (355). For each incoming packet a pointer is placed in the corresponding OQ (345). Thus, filling of the OQ's must be monitored so as OQ's and SM do not overfill. Filling thresholds (360) are associated to the set of OQ's, one per output port. Hence, filling levels can be reported to the VOQ's of all ingress QM's (320). When a certain level of filling is reached traffic for that port destination must be hold in the ingress QM's. Filling is reported under the form of threshold crossings on a per priority basis. That is, when the threshold associated to the lowest priority, P3 in this example, is crossed (362) in a particular OQ, the traffic for that destination at that level of priority is held. If OQ continues to fill up more thresholds are crossed (364) and corresponding priority traffic, for that destination, is held in all QM's. Thus, backpressure is progressively exercised from switch core OQ's to ingress VOQ's on a per destination and priority basis.

This mechanism is typical of the way backpressure is carried out in a switch. What is described, as an example, between the switch core and QM ingress VOQ's is done in a similar way between QM's and NPU's and more generally, when applicable, between all communications devices.

Memory is not the only type of shared resources that may deserve to be flow-controlled in a switch. The links between devices are also sometimes shared resources. Referring again to FIG. 2 the links (205) bandwidth between the lower QM (265) and switch core (200) is actually shared between the four NPU's (235) connected, as already discussed above, in sub-port mode to QM (265). Then, not only the queuing and buffering QM memory resources are to be shared between NPU's but also the links (205) bandwidth. Then, depending on the traffic received it is possible that all the available bandwidth of the outgoing links is hogged, for a significant period of time, by traffic to a same given sub-port (while, ideally, bandwidth should always be equally shared between the four sub-ports of this example). Hence, a flow control may have also to be exercised to the sources of traffic which, again, are the corresponding VOQ's of ingress QM's. VOQ's, which are organized by destination, should not only include switch core port destinations, but all the switch fabric sub-ports as well. Thus, a metering of the shared resource i.e., the used links bandwidth per sub-port and possibly per priority, may be carried out and reported through the backpressure mechanism in a manner similar to what has been discussed above for the OQ's and the shared memory resource.

Thus, the invention is not limited to control a single type of shared resources. Although it is mostly illustrated with the sharing and level of filling of a memory and/or other resources like links bandwidth may need to be flow-controlled as well assuming that a resource metering is achieved e.g., as in FIG. 3 (340) where thresholds are set which allow to simply monitor the filling of switch core OQ's thus the overall filling of the associated shared memory (350). In a similar way links bandwidth utilization can be monitored and thresholds set to control the fraction of the available bandwidth actually utilized by a given source of traffic so as it can be paced if necessary.

Figure 4:
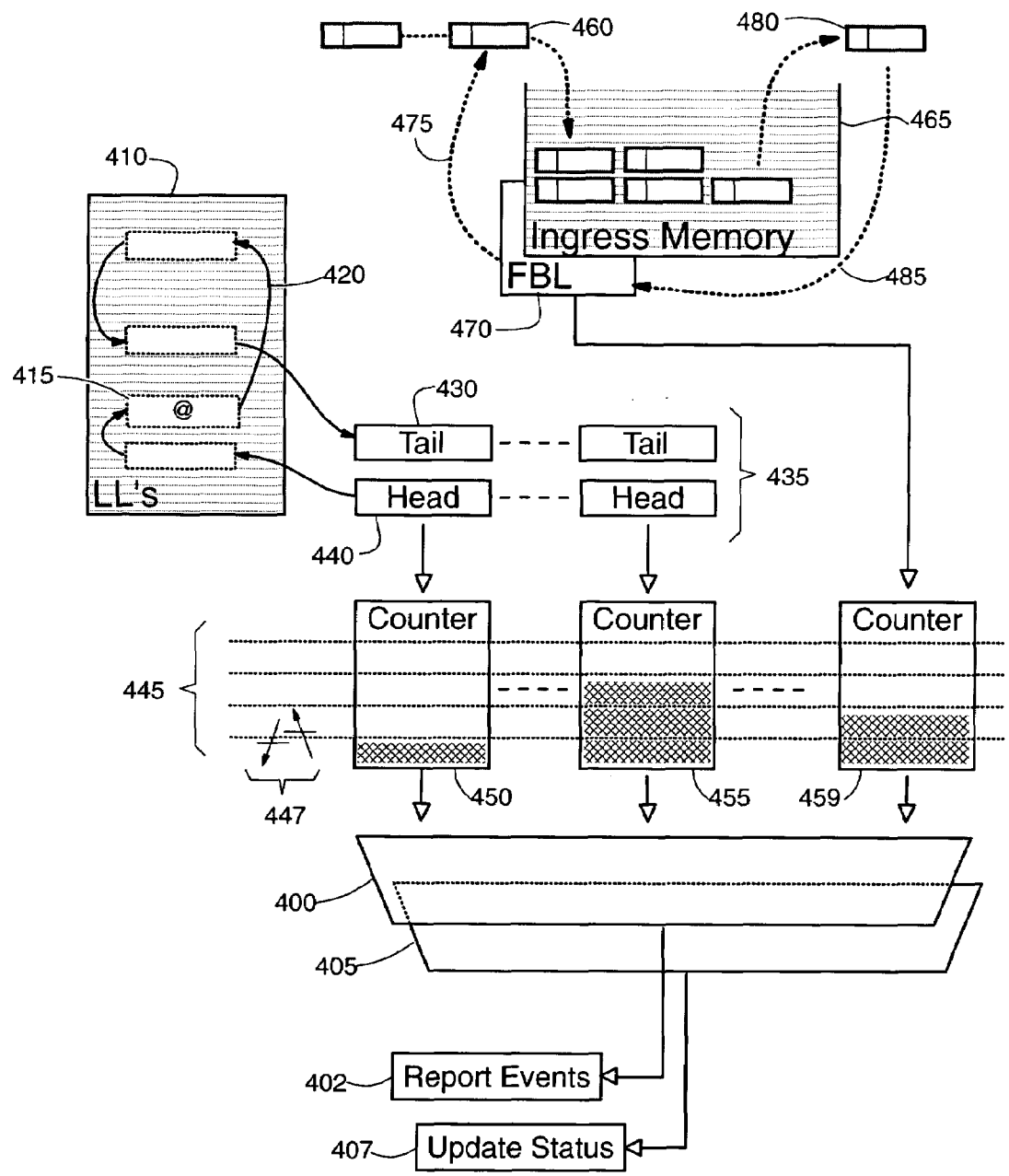
FIG. 4 illustrates, through an example, how the invention is carried out between virtual output queueing's of an ingress queue manager and several network processor units connected to it in sub-port mode.

FIG. 4 illustrates, through an example, how the invention is carried out between VOQ's of an ingress QM and several NPU's connected to it in sub-port mode. As already mentioned in FIG. 2 queuing structure of the ingress QM is a shared resource that must be carefully managed so as each connected NPU is always granted a fair share of it.

VOQ is in practice made of a single ingress memory (465) to hold, irrespective of their destinations and priorities, all the incoming packets (460) as soon as they are received from any of the NPU's shown in FIG. 2 (235). For each arriving packet a buffer location is withdrawn (475) from a FBL or free buffer list (470). Packets stay in ingress memory till they are selected to be forwarded to the switch core (480) at which time the buffer location is released to the FBL (485) in order to be reused. The virtual output queuing is practically achieved by forming, in a separate memory (410), linked lists of packets present in ingress memory. That is, all packets destined for a same port or sub-port, sharing a same priority or belonging to a same class of service or flow of traffic, are linked together (420). There is a tail (430) and a head (440) register per linked list and there are as many linked lists (LL's) as destinations, priorities, classes of service or types of flows to be handled by the switch. Because FBL uniquely attributes the buffer locations, all linked lists can be held in a single LL memory (410), while there are as many pairs of tail and head registers as there are linked lists (435). When a new packet arrives (460) it is appended to the corresponding linked list i.e., to the tail of the list, in which case corresponding tail register is updated and a new entry in RAM (410) done. Conversely, when a packet is removed, to be sent to the switch core, the head of list is selected and head register (440) updated thus, voiding corresponding entry. Linked list entries such as (415) remember the address where corresponding packets are to be retrieved in ingress memory (465) and point to the next entry (420) of the list.

The mechanisms described above and methods to implement high-speed linked lists are not further discussed since, if they are necessary to implement the invention, they use, however, techniques well known from the art. Especially, forming LL's has been the subject of numerous publications. For a discussion on this subject one may refer, e.g., to a book by Robert Sedgewick, 'Algorithms', second edition, Addison-Wesley, 1988, ISBN 0-201-06673-4 and more specifically to chapter 3 'Elementary Data Structures'.

In this particular example of carrying out the invention a metering of the shared resource occupancy i.e., the ingress memory (465), is performed by keeping track through individual counters (450, 455) of how many packets are in each linked list thus counting the number of waiting packets per destination, priority, class of service etc. when applicable. The number of linked list to be formed is highly dependent on the kind of application considered. In a standard application there are generally as many LL's to be formed as there are destination ports (possibly including the switch fabric sub-ports) multiplied by the number of priorities supported by the switching function. However, in more sophisticated switching applications one may want to further discriminate the flows of traffic. For example, modern IP routers and switches used in multi-application network may need to reserve bandwidth for real-time traffic i.e., voice and video. This ends up to have specific class of service thus, multiplying accordingly the number of linked lists. Also, the overall occupancy of the shared ingress memory must be watched with a global counter (459).

All counters are monitored. This is simply achieved by setting thresholds (445) i.e., watermarks filling. Although a same set of thresholds is shown here to apply to all counters it should be obvious to those skilled in the art that thresholds could have to be set differently for different linked lists or groups of linked lists depending on the type of traffic they are monitoring. Indeed, in a particular application, one may want to attribute a larger or lower share of a common resource to a given type of traffic. Then, when a counter threshold is crossed, in either direction (447), an event is issued towards the upstream relevant communication device (s), or just broadcast, in which case those of the devices that are not concerned ignore the information.

Those skilled in the art will recognize that, to prevent the sending of too many events, when the filling of the resource stays close to a watermark, some sort of hysteresis effect has to be applied to each threshold. That is, a threshold setting is in practice made of two distinct values (447) so that the up crossing is made higher than the down crossing to prevent any oscillation around a single-valued threshold.

Then, all events are collected (400) and prioritized, if necessary, to be sent to the upstream devices. As already discussed in FIG. 2, this can be accomplished in several ways. The information can be encoded and transported in all packet headers, sent backward from the egress QM in this example, and generally from the egress side of the device where the shared resource is to be flow controlled. The occurrence of events can also trigger the sending of special control packets where the payload carries the events to be reported. A third way is to have a separate communication channel like a shared bus as shown in FIG. 2 (280). Whichever means is used the invention assumes that all events such as threshold crossings (447) are immediately reported (402) once when they occur to the relevant upstream devices or broadcast.

Also, the invention assumes that the status of the shared resource, here the ingress memory implementing the QM ingress VOQ, is monitored (405) and regularly reported (407), in a same way as the events, so upstream devices can always eventually update an overall status of the shared resource even though events were not all received or when a new device is added.

Figure 5:
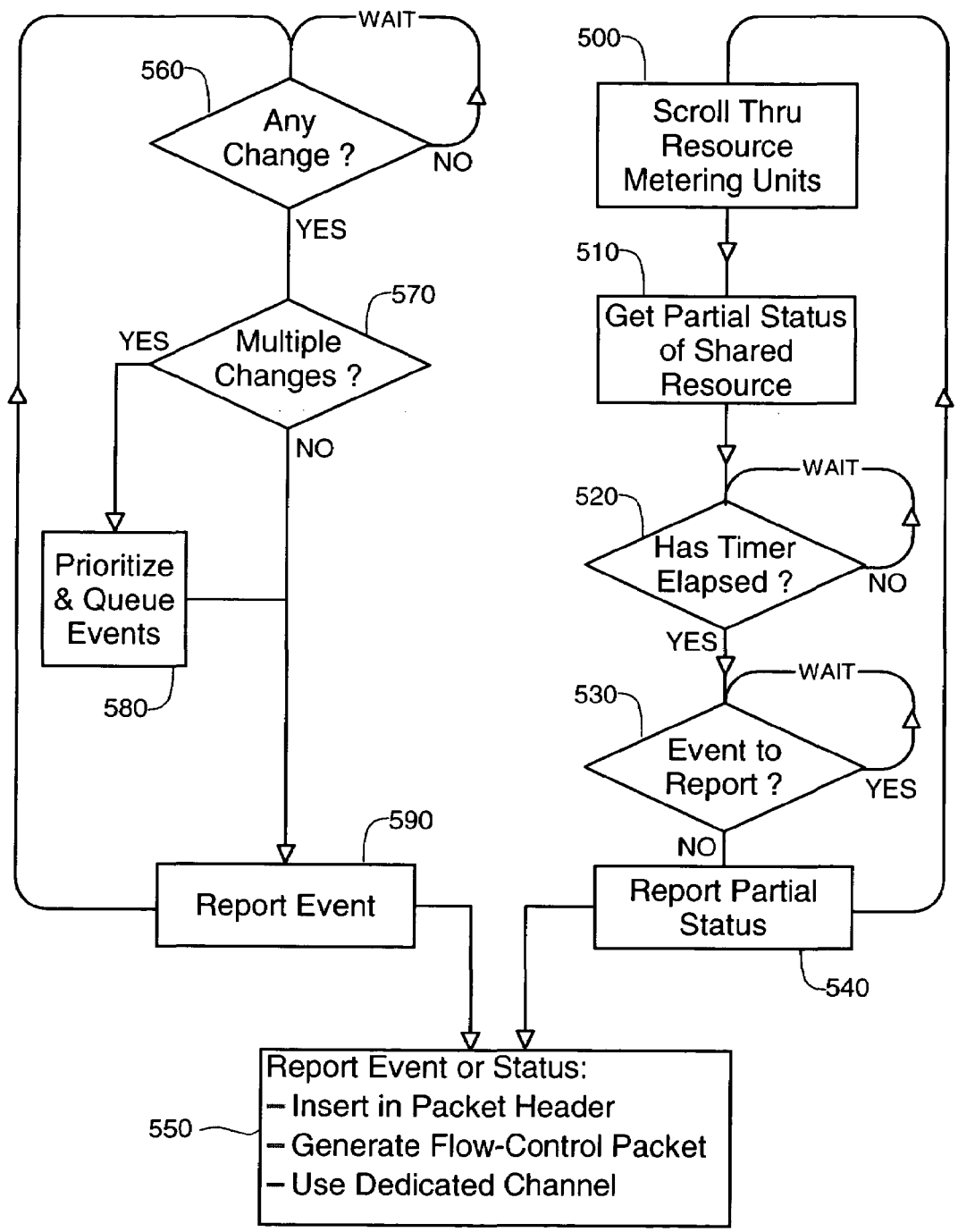
FIG. 5 is a flow diagram of the reporting of events and status from the shared resource that is flow-controlled.

FIG. 5 is a state diagram of the reporting of events and status from the shared resource that is flow-controlled.

A status is reported by transmitting at scheduled intervals the state of the various metering units that are put in place to evaluate the resource level of utilization i.e., in the example used to illustrate the invention, the levels of filling of the various queues and the overall filling of the ingress memory. This is done under the form of counter thresholds that are exceeded. Since thousands of queues may have to be managed they cannot generally all be reported in a single status report. Thus, metering units are scrolled (500) to get the status of a subset of them (510). When time has come to send the information (520) the partial report status is forwarded (540). However, event reporting always takes precedence (530) and status reporting is delayed if necessary. Reporting of the status is a background task which allows upstream devices to gather progressively all the information they need about the state of utilization of a device.

Whenever a change occurs (560), e.g., the crossing of a threshold, an event is generated immediately (590). However, if multiple events occur simultaneously (570), they must be prioritized (580) if they cannot be comprised in a single event report. The way prioritization is done is highly dependent on a particular design and application. Generally, events corresponding to high priority traffic are reported first.

Events and status may be reported (550) through the same channel or through different channels that are, as already mentioned, the packet headers, some control packets dedicated to flow-control or a dedicated out-of-band channel.

Figure 6:
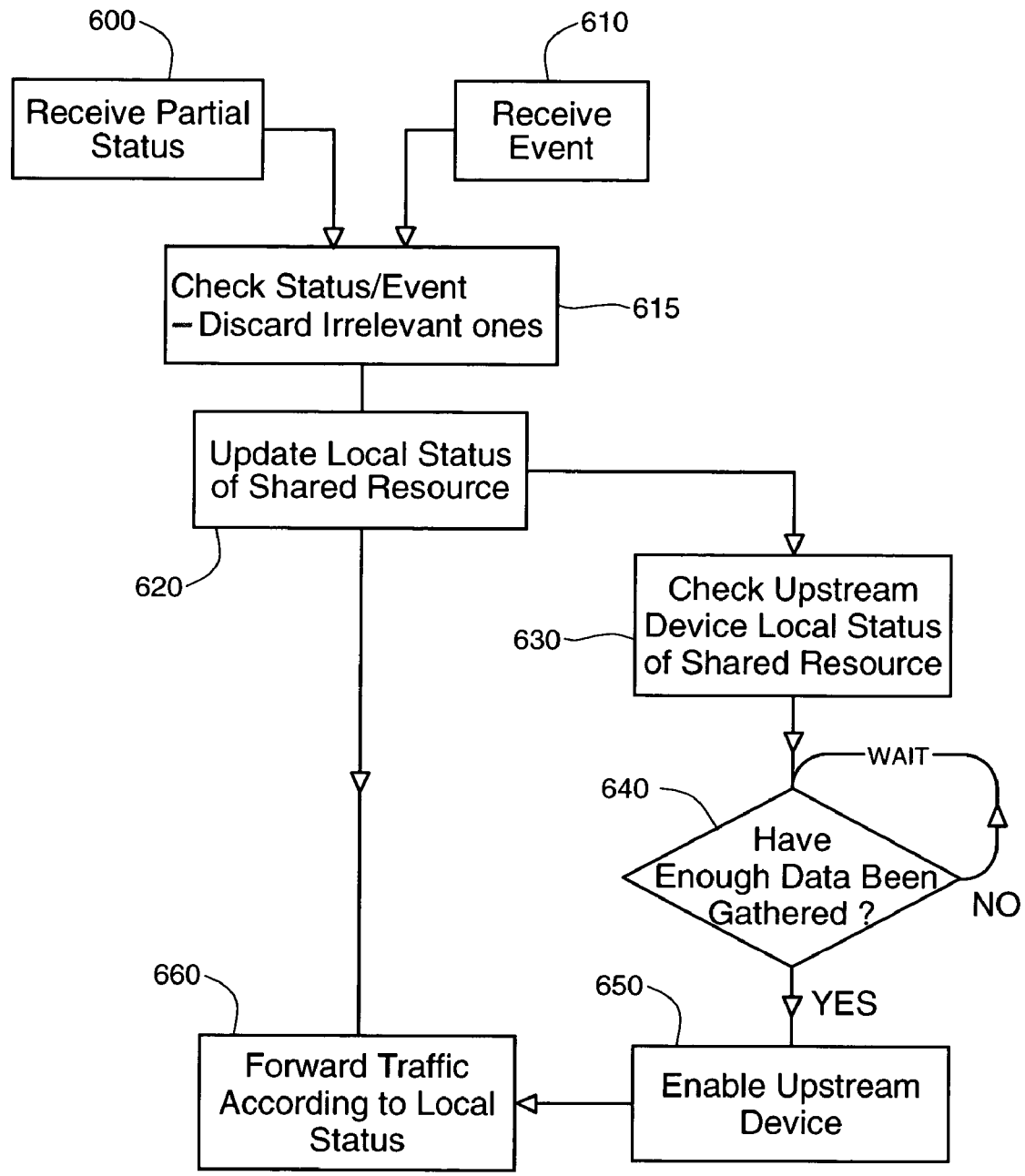
FIG. 6 is a flow diagram of the gathering of events and status about a shared resource in a forwarding upstream device.

FIG. 6 is a state diagram of the gathering of events and status about a shared resource in a forwarding upstream device. Upstream device receives, as soon as they are generated by a downstream resource, all the events (610) and partial status (600) generated downstream. Status and events are checked (615) to verify if they are relevant for the upstream device considered.

This step (615) is optional and only necessary if events and status are broadcast to all devices or multicast to a group of them (rather than directed to a specific device). Upstream device must then just ignore all the information they have no use of it.

Events and partial status are used to update a local status of the shared resource (620) so that it can be used to adapt the traffic to forward to the actual level of availability of the downstream shared resource (660). As an example, this may lead to send traffic only at some level of priority or on specific flows. However, this is authorized only after the upstream device has been enabled (650). Enabling the upstream device is only obtained when enough data has been gathered (640) on the status of the downstream shared resource. Hence, whenever the local status is updated a checking is performed (630). Thus, forwarding upstream device cannot send traffic until it has acquired enough information on the target device preventing this latter from being disturbed by a new joining piece of equipment that suddenly starts to forward uncontrolled traffic.

Hence, the invention combines the advantages of an event-driven flow-control to the ones of a system where status is permanently or cyclically reported. Through an immediate reporting of all events, information is only updated when necessary thus, dramatically reducing the bandwidth necessary to carry it to all upstream devices while overall status of a shared resource is however refreshed at scheduled intervals thus taking care of all the error cases e.g., when an upstream device misses an event.

The invention also provides for the insertion of a new device or when a piece of equipment is waking up in an active node of a network thus, enabling it only when enough information has been gathered on the status of the downstream pieces of equipment.

What is claimed is:

1. An event-driven flow control method in a switching node comprising at least one shared resource, the status of said at least one shared resource being determined by an associated resource metering unit characterizing the occupancy of said at least one shared resource, said method, using a timer, comprising:
   in said shared resource,
   generating an event when the occupancy of said at least one shared resource changes; and,
   transmitting said event to devices sharing said at least one shared resource;
   each time said timer elapses,
   getting a partial status of said at least one shared resource; and,
   transmitting said partial status to devices sharing said at least one shared resource; and
   in devices sharing said at least one shared resource,
   updating a local status based on said partial status and on said events;
   checking said local status for completeness;
   determining whether enough of said events and of said partial status have been gathered; and,
   if enough of said events and of said partial status have been gathered,
   forwarding traffic according to said local status.

* * * * *